US012409085B2

(12) United States Patent
Van De Wal et al.

(10) Patent No.: US 12,409,085 B2
(45) Date of Patent: Sep. 9, 2025

(54) POWERED MIDWHEEL DRIVE WHEELCHAIR WITH STANDING CAPABILITY

(71) Applicant: PERMOBIL AB, Timrå (SE)

(72) Inventors: Herbert Van De Wal, Alnö (SE); Anton Danielsson, Timrå (SE); Ulrik Löfvander, Härnösand (SE)

(73) Assignee: PERMOBIL AB, Timrå (SE)

( * ) Notice: Subject to any disclaimer, the term of this patent is extended or adjusted under 35 U.S.C. 154(b) by 153 days.

(21) Appl. No.: 18/347,802

(22) Filed: Jul. 6, 2023

(65) Prior Publication Data

US 2024/0009045 A1 Jan. 11, 2024

(30) Foreign Application Priority Data

Jul. 7, 2022 (EP) .................................... 22183660

(51) Int. Cl.
*A61G 5/14* (2006.01)
*A61G 5/04* (2013.01)

(52) U.S. Cl.
CPC ............... *A61G 5/14* (2013.01); *A61G 5/043* (2013.01)

(58) Field of Classification Search
CPC .................................. A61G 5/14; A61G 5/043
USPC .......................................................... 180/6.62
See application file for complete search history.

(56) References Cited

U.S. PATENT DOCUMENTS 5,346,280 A * 9/1994 Deumite .................. A61G 5/14
297/DIG. 10
6,554,086 B1 4/2003 Goertzen et al.
6,773,032 B2 8/2004 Redman et al.
6,776,430 B2 8/2004 White et al.
6,805,122 B2 10/2004 Richey, II et al.
6,851,711 B2 2/2005 Goertzen et al.
6,923,180 B2 8/2005 Richey, II et al.
(Continued)

FOREIGN PATENT DOCUMENTS

AU 347015 S 2/2013
AU 347016 S 2/2013
(Continued)

OTHER PUBLICATIONS

US 8,538,599 B2, 09/2013, Peters et al. (withdrawn)
US 10,925,785 B2, 02/2021, Mulhern et al. (withdrawn)

*Primary Examiner* — Jacob D Knutson

(74) *Attorney, Agent, or Firm* — Michael Best & Friedrich LLP

(57) ABSTRACT

A powered midwheel drive wheelchair includes a chassis, a seating system attached to the chassis, the seating system configured to move between a seated position and a standing position, a pair of drive wheels, a pair of front swing arms pivotally connected to the chassis, and front support wheels attached to a respective one of the front swing arms, wherein each front swing arm is configured to pivot relative to the chassis between a first position, where the front support wheel is at its uppermost position in relation to the chassis, and a second position, where the front support wheel is at its lowermost position in relation to the chassis, and wherein the front swing arms are configured to pivot to the first position in response to the seating system transitioning to the standing position, whereby the chassis is configured to tilt forward in relation to the floor surface.

20 Claims, 4 Drawing Sheets

(56) References Cited

U.S. PATENT DOCUMENTS

| | | | |
|---|---|---|---|
| 6,923,278 | B2 | 8/2005 | Mulhern et al. |
| 6,923,280 | B2 | 8/2005 | Goertzen et al. |
| 6,935,448 | B2 | 8/2005 | Goertzen et al. |
| 6,938,923 | B2 | 9/2005 | Mulhern et al. |
| 6,997,082 | B2 | 2/2006 | Snyder et al. |
| 7,007,963 | B2 | 3/2006 | Meyer |
| 7,040,429 | B2 | 5/2006 | Molnar |
| 7,055,634 | B2 | 6/2006 | Molnar |
| 7,066,290 | B2 | 6/2006 | Fought |
| 7,083,195 | B2 | 8/2006 | Goertzen et al. |
| 7,219,755 | B2 | 5/2007 | Goertzen et al. |
| 7,219,924 | B2 | 5/2007 | Mulhern et al. |
| 7,232,008 | B2 | 6/2007 | Levi et al. |
| 7,278,653 | B2 | 10/2007 | Pelka et al. |
| 7,293,801 | B2 | 11/2007 | Bertrand et al. |
| 7,294,170 | B2 | 11/2007 | Richey, II et al. |
| 7,302,716 | B2 | 12/2007 | Snyder et al. |
| 7,311,329 | B2 | 12/2007 | Mulhern |
| 7,314,220 | B2 | 1/2008 | Turturiello et al. |
| 7,316,282 | B2 | 1/2008 | Mulhern et al. |
| 7,331,632 | B2 | 2/2008 | Wendt |
| 7,344,155 | B2 | 3/2008 | Mulhern et al. |
| 7,374,002 | B2 | 5/2008 | Fought |
| 7,380,642 | B2 | 6/2008 | Müller |
| 7,389,835 | B2 | 6/2008 | Mulhern et al. |
| 7,403,844 | B2 | 7/2008 | Chopcinski et al. |
| 7,413,038 | B2 | 8/2008 | Mulhern et al. |
| 7,419,176 | B2 | 9/2008 | Perk |
| 7,428,759 | B2 | 9/2008 | Bain et al. |
| 7,472,767 | B2 | 1/2009 | Molnar |
| 7,597,163 | B2 | 10/2009 | Goertzen et al. |
| D604,208 | S | 11/2009 | Perk et al. |
| 7,635,135 | B2 | 12/2009 | Huber et al. |
| 7,726,689 | B2 | 6/2010 | Mulhern et al. |
| 7,735,591 | B2 | 6/2010 | Puskar-Pasewicz et al. |
| D622,641 | S | 8/2010 | Chen et al. |
| 7,766,106 | B2 | 8/2010 | Puskar-Pasewicz et al. |
| 7,887,133 | B2 | 2/2011 | Perk |
| 7,891,695 | B2 | 2/2011 | Perk |
| 7,896,394 | B2 | 3/2011 | Jackson et al. |
| 7,931,300 | B2 | 4/2011 | Mulhern et al. |
| 8,037,953 | B2 | 10/2011 | Puskar-Pasewicz et al. |
| 8,061,755 | B2 | 11/2011 | Brendel et al. |
| 8,065,051 | B2 | 11/2011 | Chopcinski et al. |
| 8,073,585 | B2 | 12/2011 | Jaenke et al. |
| 8,073,588 | B2 | 12/2011 | Peters et al. |
| 8,113,531 | B2 | 2/2012 | Zhou et al. |
| 8,118,321 | B2 | 2/2012 | Hunziker et al. |
| 8,123,497 | B2 | 2/2012 | Richey, II et al. |
| 8,127,875 | B2 | 3/2012 | Mattes et al. |
| 8,145,373 | B2 | 3/2012 | Jaenke et al. |
| 8,172,015 | B2 | 5/2012 | Molnar |
| 8,181,992 | B2 | 5/2012 | Mulhern et al. |
| 8,210,556 | B2 | 7/2012 | Zhou et al. |
| 8,235,407 | B2 | 8/2012 | Cerreto et al. |
| 8,262,117 | B2 | 9/2012 | Knopf et al. |
| 8,272,461 | B2 | 9/2012 | Bekoscke et al. |
| 8,285,440 | B2 | 10/2012 | Jaenke et al. |
| 8,286,745 | B2 | 10/2012 | Kosco et al. |
| 8,292,010 | B2 | 10/2012 | Puskar-Pasewicz et al. |
| 8,297,388 | B2 | 10/2012 | Lindenkamp et al. |
| 8,297,641 | B2 | 10/2012 | Landry et al. |
| 8,403,352 | B2 | 3/2013 | Hunziker |
| 8,408,343 | B2 | 4/2013 | Puskar-Pasewicz et al. |
| 8,408,598 | B2 | 4/2013 | Mulhern et al. |
| 8,437,899 | B2 | 5/2013 | Jaenke et al. |
| 8,469,383 | B2 | 6/2013 | Zhou et al. |
| 8,474,848 | B2 | 7/2013 | Bernatsky et al. |
| 8,490,994 | B2 | 7/2013 | Knopf |
| 8,534,679 | B2 | 9/2013 | Goertzen et al. |
| 8,573,341 | B2 | 11/2013 | Fought |
| 8,616,309 | B2 | 12/2013 | Art et al. |
| D699,160 | S | 2/2014 | Yang |
| D699,161 | S | 2/2014 | Yang |
| 8,646,551 | B2 | 2/2014 | Mattes et al. |
| 8,727,048 | B2 | 5/2014 | Jurkiewicz et al. |
| 8,789,632 | B2 | 7/2014 | Maurer et al. |
| 8,793,032 | B2 | 7/2014 | Peters et al. |
| 8,794,359 | B2 | 8/2014 | Bekoscke et al. |
| 8,820,454 | B2 | 9/2014 | Jost et al. |
| 8,833,774 | B2 | 9/2014 | Goertzen et al. |
| 8,844,961 | B2 | 9/2014 | Hunziker |
| 8,870,216 | B2 | 10/2014 | Maurer et al. |
| 8,910,975 | B2 | 12/2014 | Bekoscke et al. |
| 8,919,797 | B2 | 12/2014 | Lowenthal et al. |
| 8,925,943 | B2 | 1/2015 | Molnar |
| 8,931,583 | B2 | 1/2015 | Tuckowski et al. |
| 8,977,431 | B2 | 3/2015 | Peters et al. |
| 9,010,470 | B2 | 4/2015 | Cuson et al. |
| 9,033,360 | B2 | 5/2015 | Davis et al. |
| 9,084,705 | B2 | 7/2015 | Jaenke et al. |
| D745,443 | S | 12/2015 | Van Olst et al. |
| 9,211,222 | B2 | 12/2015 | Olst et al. |
| 9,301,894 | B2 | 4/2016 | Mulhern et al. |
| 9,308,143 | B2 | 4/2016 | Bekoscke et al. |
| 9,308,226 | B2 | 4/2016 | Borody |
| 9,333,130 | B2 | 5/2016 | Puskar-Pasewicz et al. |
| 9,346,335 | B2 | 5/2016 | Bekoscke et al. |
| 9,351,889 | B2 | 5/2016 | Mulhern et al. |
| 9,351,891 | B2 | 5/2016 | Maurer et al. |
| 9,364,377 | B2 | 6/2016 | Goertzen et al. |
| 9,370,455 | B2 | 6/2016 | Molnar |
| 9,375,372 | B2 | 6/2016 | Hunziker |
| 9,440,690 | B2 | 9/2016 | Manternach et al. |
| 9,456,942 | B2 | 10/2016 | Peters et al. |
| 9,468,571 | B2 | 10/2016 | Art et al. |
| 9,474,664 | B2 | 10/2016 | Mulhern et al. |
| 9,522,091 | B2 | 12/2016 | Mattes et al. |
| 9,526,664 | B2 | 12/2016 | Mulhern et al. |
| 9,532,912 | B2 | 1/2017 | Loewenthal et al. |
| 9,566,200 | B2 | 2/2017 | Mulhern et al. |
| 9,700,470 | B2 | 7/2017 | Bekoscke et al. |
| 9,757,291 | B2 | 9/2017 | Hunziker |
| 9,808,383 | B2 | 11/2017 | Mulhern et al. |
| 9,827,823 | B2 | 11/2017 | Bekoscke et al. |
| 9,867,747 | B2 | 1/2018 | Maurer et al. |
| 9,872,804 | B2 | 1/2018 | Puskar-Pasewicz et al. |
| 9,907,712 | B2 | 3/2018 | Maurer et al. |
| 9,913,768 | B2 | 3/2018 | Cuson et al. |
| 9,925,100 | B2 | 3/2018 | Goertzen et al. |
| 9,962,413 | B2 | 5/2018 | Borody |
| 10,022,406 | B2 | 7/2018 | Borody |
| 10,064,899 | B1 | 9/2018 | Borody |
| 10,130,532 | B2 | 11/2018 | Mulhern et al. |
| 10,130,534 | B2 | 11/2018 | Mattes et al. |
| 10,150,606 | B2 | 12/2018 | Sewell et al. |
| 10,265,229 | B2 | 4/2019 | Bekoscke et al. |
| 10,272,004 | B2 | 4/2019 | Art et al. |
| 10,278,997 | B2 | 5/2019 | Borody |
| 10,314,751 | B2 | 6/2019 | Frei |
| 10,328,107 | B2 | 6/2019 | Borody |
| D860,873 | S | 9/2019 | Grant |
| 10,434,019 | B2 | 10/2019 | Bekoscke et al. |
| 10,463,702 | B2 | 11/2019 | Borody |
| 10,512,572 | B2 | 12/2019 | Goertzen et al. |
| 10,532,626 | B2 | 1/2020 | Bekoscke et al. |
| 10,561,548 | B1 | 2/2020 | Mulhern et al. |
| 10,588,797 | B2 | 3/2020 | Mulhern et al. |
| 10,610,551 | B2 | 4/2020 | Borody |
| 10,617,724 | B2 | 4/2020 | Borody |
| D887,311 | S | 6/2020 | Wu et al. |
| D887,313 | S | 6/2020 | Wu et al. |
| 10,675,309 | B2 | 6/2020 | Borody |
| 10,687,997 | B2 | 6/2020 | Mulhern et al. |
| 10,736,801 | B2 | 8/2020 | Lin |
| 10,828,212 | B2 | 11/2020 | Mulhern et al. |
| 10,836,555 | B2 | 11/2020 | Sewell et al. |
| 10,849,937 | B2 | 12/2020 | Borody |
| 10,857,188 | B2 | 12/2020 | Borody |
| 10,874,566 | B2 | 12/2020 | Frei |
| 10,912,690 | B2 | 2/2021 | Bekoscke et al. |
| 10,940,447 | B2 | 3/2021 | Parks |
| 10,987,385 | B2 | 4/2021 | Borody |
| 11,065,284 | B2 | 7/2021 | Borody |

(56) References Cited

U.S. PATENT DOCUMENTS 11,103,541 B2 8/2021 Borody
11,129,859 B2 9/2021 Borody
11,141,330 B2 10/2021 Mulhern et al.
11,173,183 B2 11/2021 Borody
2004/0035627 A1 2/2004 Joseph, II et al.
2004/0040769 A1 3/2004 Joseph, II et al.
2006/0026755 A1 2/2006 Bain et al.
2007/0045014 A1 3/2007 Greig et al.
2007/0045021 A1 3/2007 Greig et al.
2007/0045022 A1 3/2007 Greig et al.
2007/0063502 A1 3/2007 Greig et al.
2008/0169136 A1 7/2008 Meyer
2009/0072510 A1 3/2009 Mueller
2011/0215540 A1* 9/2011 Hunziker ................. A61G 5/14
280/5.2
2014/0021905 A1 1/2014 Tsai
2015/0054326 A1 2/2015 Cai et al.
2015/0084307 A1* 3/2015 Goldish ................... A61G 5/10
280/250
2017/0296407 A1 10/2017 Kuschall et al.
2020/0155387 A1 5/2020 Bekoscke et al.
2020/0163815 A1 5/2020 Puschmann et al.
2020/0289350 A1 9/2020 Silveira et al.
2020/0297561 A1 9/2020 Ciolfe et al.
2020/0353977 A1 11/2020 Davies et al.
2021/0244583 A1 8/2021 Traxinger et al.
2021/0282993 A1 9/2021 Davis

FOREIGN PATENT DOCUMENTS

AU 2016201588 B2 8/2017
AU 2017261589 B2 2/2019
CA 2605373 C 4/2010
CA 2838376 C 10/2015
CN 204033637 U 12/2014
CN 204472447 U 7/2015
CN 102499827 B 11/2015
CN 212853852 U 4/2021
DE 1020172103974 B4 3/2019
EP 1493418 A1 * 1/2005 ............ A61G 5/042
EP 1479362 A3 2/2005
EP 1522295 A3 4/2005
EP 1422294 A3 6/2005
EP 1522292 A3 7/2005
EP 1534208 B1 12/2006
EP 1345670 B1 1/2007
EP 1427372 B1 5/2007
EP 1752122 B1 8/2007
EP 1772343 B1 2/2008
EP 1637111 B1 7/2008
EP 2036523 A1 3/2009
EP 1681042 B1 5/2009
EP 1849447 B1 10/2009
EP 1859765 B1 3/2010
EP 1924488 B1 4/2010
EP 1349739 B1 6/2010
EP 1732490 B1 7/2010
EP 2101704 B1 8/2010
EP 1773697 B1 11/2010
EP 2111203 B1 1/2011
EP 2174630 B1 1/2011
EP 2039335 B1 2/2011
EP 1534545 B1 4/2011
EP 1778156 B1 4/2011
EP 2111204 B1 4/2011
EP 1435889 B1 8/2011
EP 1802263 B1 2/2012
EP 2219582 B1 4/2012
EP 2272478 B1 5/2012
EP 2295017 B1 5/2012
EP 2114335 B1 6/2012
EP 2190396 B1 7/2012
EP 2311420 B1 7/2012
EP 2332506 B1 8/2012
EP 1789004 B9 10/2012
EP 2364868 B1 10/2012
EP 2127624 B1 3/2013
EP 2364867 B1 3/2013
EP 2070744 B1 4/2013
EP 2340800 B1 4/2013
EP 2394622 B1 5/2013
EP 2127625 B1 1/2014
EP 2332753 B1 1/2014
EP 2688157 A2 1/2014
EP 2716268 A2 * 4/2014 ............ A61G 5/043
EP 2497452 B1 6/2014
EP 1937112 B1 7/2014
EP 2327572 B1 7/2014
EP 2277490 B1 1/2015
EP 2839762 A1 2/2015
EP 2175821 B1 7/2015
EP 2428193 B1 8/2015
EP 2389915 B1 10/2015
EP 2409674 B1 12/2015
EP 2888974 B1 10/2016
EP 1434545 B1 11/2016
EP 2222265 B1 11/2016
EP 2898866 B1 1/2017
EP 2376049 B9 2/2017
EP 2389914 B1 2/2017
EP 2624799 B1 3/2017
EP 2485698 B1 * 5/2017 .............. A61G 5/04
EP 2968041 B1 7/2017
EP 2758017 B1 9/2017
EP 2838487 B1 9/2017
EP 2814441 B9 11/2017
EP 2532335 B1 12/2017
EP 3238682 A3 1/2018
EP 2716268 B1 3/2018
EP 3082706 B1 5/2018
EP 3082705 B1 6/2018
EP 3222261 B1 6/2018
EP 3245994 B1 2/2019
EP 1928386 B1 5/2019
EP 3113743 B1 5/2019
EP 3424515 A3 6/2019
EP 3351228 B1 9/2019
EP 2758018 B1 4/2020
EP 3437615 B1 4/2020
EP 3656364 A1 5/2020
EP 3701958 A1 9/2020
EP 3193804 B1 10/2020
EP 3245995 B1 10/2020
EP 1928387 B1 12/2020
ES 1229119 U 5/2019
FR 3024322 B1 8/2016
FR 3067920 B1 8/2019
FR 3086168 B3 10/2020
GB 513428 B 4/2015
GB 514435 B 9/2015
GB 564728 B 11/2019
GR 2003174 Y 6/2020
IN 2010M0229 8/2010
IT 1398858 B1 6/2011
IT 20155728 A1 5/2017
IT 2016557 A1 11/2017
IT 2016558 A1 11/2017
JP 2007209687 A * 8/2007
JP 6845977 B2 * 3/2021
TW M490866 U 12/2014
TW M554789 U 2/2018
TW M558573 U 4/2018
TW M567625 U 10/2018
TW M572219 U 1/2019
TW M578575 U 6/2019
WO WO03103366 A2 12/2003
WO WO2004037569 A2 5/2004
WO WO2007027971 A2 3/2007
WO WO2009036735 A1 3/2009
WO WO2011060345 A2 5/2011
WO WO2011116063 A2 9/2011
WO WO2012016287 A2 2/2012
WO WO2013040739 A1 3/2013

(56) References Cited

FOREIGN PATENT DOCUMENTS

| | | | |
|---|---|---|---|
| WO | WO2017049252 | A1 | 3/2017 |
| WO | WO2017147569 | A1 | 8/2017 |
| WO | WO2018156990 | A1 | 8/2018 |
| WO | WO2019237113 | A1 | 12/2019 |
| WO | WO2020009704 | A1 | 1/2020 |
| WO | WO2020132685 | A1 | 6/2020 |

* cited by examiner

POWERED MIDWHEEL DRIVE WHEELCHAIR WITH STANDING CAPABILITY

CROSS-REFERENCE TO RELATED APPLICATIONS

This application claims priority to European Patent Application No. EP22183660, which was filed on Jul. 7, 2022 and entitled "Powered Midwheel Drive Wheelchair with Standing Capability," the contents of which is hereby incorporated by reference in its entirety.

TECHNICAL FIELD

The present disclosure generally relates to midwheel drive wheelchairs.

BACKGROUND

Midwheel drive (MWD) wheelchairs have front wheels, rear wheels, and drive wheels arranged between the front wheels and the rear wheels.

Some MWD wheelchairs have standing capability. This means that the seating system, which comprises a seat and a backrest, can be manoeuvred between a default lowered or seated position and an upright position. In the upright position, the seat is tilted forward, and the backrest is maintained in a generally vertical position thus supporting a standing position of the user.

An MWD wheelchair must be stable when the seating system has been set in the upright position to ensure that it does not tip forward.

EP2114335 discloses a stand-up wheelchair which has a central wheel drive and front wheels operatively connected by an endless chain. The frame has a front part and a rear part which are connected to each other in an articulated manner. In the sitting position, the front wheels are not in direct contact with the ground. In the standing position, the front wheels are in contact with the ground, but the central wheels are not. Drawbacks with this wheelchair are that it has an extensive turning radius, making it impractical for indoor use. In addition, the drive arrangement is complex and costly, and having the front wheels off the ground in the seated position has a negative impact on the drive comfort for the user.

WO2020188345 discloses a power wheelchair stander having drive wheels and front and rear support wheels. The wheelchair is configured to be moved between a seating position and a standing position. In order to prevent the wheelchair from tipping over as a result of the centre of gravity moving forward and/or upward in the standing position, it is provided with a suspension assembly that allows the suspension system to articulate when the user positioning system is in the seated position and to limit or fully lock such articulation when the user positioning system is in the standing position. However, this is accomplished through a system of links and locking/limiting elements that will inevitably increase complexity, and drive costs.

JP2018099233 A discloses a wheelchair comprising a pair of base frames to which front caster arms are immovably fixed. The wheelchair further has movable frames connected to a respective one of the base frames for changing the position of the user.

SUMMARY

A general object of the present disclosure is to provide an MWD wheelchair which solves or at least mitigates the problems of the prior art.

There is hence provided a powered midwheel drive, MWD, wheelchair comprising: a chassis, a seating system attached to the chassis, the seating system being configured to be manoeuvred between a seated position and a standing position, a pair of drive wheels, a pair of front swing arms pivotally connected to the chassis, and front support wheels attached to a respective one of the front swing arms, wherein each front swing arm is configured to pivot in relation to the chassis between a first position, in which the front support wheel is at its uppermost position in relation to the chassis, and a second position, in which the front support wheel is at its lowermost position in relation to the chassis, and wherein the front swing arms are configured to pivot to the first position when the seating system is in the standing position, whereby the chassis is tilted forward in relation to the ground or floor surface.

The seating system may thus be set in the standing position while maintaining a sufficient level of stability, as the front swing arms are bottomed out in the first position and the chassis is tilted forward. The drive wheels maintain contact with the ground or floor surface, thus supporting the weight of the MWD wheelchair and the occupant.

Further, sufficient stability can be attained without utilising complex locking mechanisms for preventing tipping behaviour, which are prone to quality issues and limit suspension movement in extreme seating positions. No additional sensors, actuation devices, or warning systems are required, making the solution more robust and cost efficient as compared to solutions found in the prior art. The solution can thus be made completely passive.

The tilting angle of the chassis relative to the horizontal ground or floor surface when the seating system is in the standing position may according to one example be at most 6°, such as in a range of 2°-4°.

The front swing arms may be pivoted to the first position and the chassis may be tilted forward as a result of the seating system transitioning from the seating position to the standing position.

The front swing arms may be pivoted to the first position and the chassis may be tilted forward as a result of a centre of gravity of the powered MWD wheelchair and/or its occupant moving during a transition from the seating position to the standing position.

According to one embodiment in the standing position of the seating system, a common centre of gravity of the powered MWD wheelchair and its occupant is located between a first vertical plane extending through pivot connections of the front swing arms with the chassis and a wheel axle plane which is a second vertical plane in which wheel axles of the front support wheels are contained when the powered MWD wheelchair rests on a planar horizontal surface.

With the term "occupant" is meant a user for whom the MWD wheelchair has been adapted with respect to the weight and body type of the user.

Each front swing arm may be rigid.

According to one embodiment for each front swing arm there is a horizontal distance L between the pivot connection of the front swing arm with the chassis and the wheel axle plane, wherein the common centre of gravity is contained in a third vertical plane located between 20-75%, such as 30-60%, of the horizontal distance L measured from the pivot connection when the seating system is in the standing position.

One embodiment comprises a pair of rear swing arms pivotally connected to the chassis, wherein each front swing arm is connected to a respective rear swing arm to enable force transfer between the front swing arms and the rear swing arms.

Each rear swing arm may be rigid.

One embodiment comprises linkage members, wherein each front swing arm and connected rear swing arm is connected via a respective linkage member.

According to one embodiment each linkage member is rigid, or substantially rigid.

The linkage members could alternatively be provided with some resilience, i.e., have a limited/minor flexibility, or be semi-rigid.

One embodiment comprises first resilient members connected to the chassis and to a respective rear swing arm.

The first resilient member may for example be a spring, such as a coil spring, an air spring, a leaf spring, or it may be made of a material having resilient characteristics, such as rubber.

In one example, the wheelchair comprises a shock absorbing device comprising the first resilient member and a damper unit.

One embodiment comprises a pair of suspension arms, each suspension arm connecting a respective front swing arm and rear swing arm, wherein each first resilient member is connected directly to a respective suspension arm and to the chassis.

One embodiment comprises second resilient members, each being directly connected between a respective pair of rear swing arm and suspension arm.

The second resilient members may for example be springs, such as coil springs.

According to one embodiment, each second resilient member is configured to force the pair of rear swing arm and suspension arm to which it is directly connected apart.

The rear swing arms are thereby brought into ground contact when the chassis is tilted forward in the standing position of the seating system. While this may not contribute to any additional stability, it may convey a visual perception to the user of a higher stability.

According to one embodiment, each suspension arm and connected rear swing arm share a pivot connection with the chassis.

One embodiment comprises a seat support to which the seating system is mounted, wherein in the standing position the seat support is at, or brings a seat of the seating system to, an angle $\alpha$ of at least 50°, such as at least 60°, or at least 70° relative to a horizontal plane when the powered MWD wheelchair rests on a horizontal surface.

One embodiment comprises a battery, wherein the chassis houses the battery.

The chassis may be a chassis box.

According to one embodiment the front swing arms are bottomed out in the first position.

According to one embodiment in the standing position of the seating system, the front swing arms are pivoted to the first position, resulting in the chassis tilting forward.

According to one embodiment pivoting of the front swing arms to the first position and the forward tilting of the chassis is achieved completely passively, without any additional motors or actuators.

Generally, all terms used in the claims are to be interpreted according to their ordinary meaning in the technical field, unless explicitly defined otherwise herein. All references to "a/an/the element, apparatus, component, means", etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
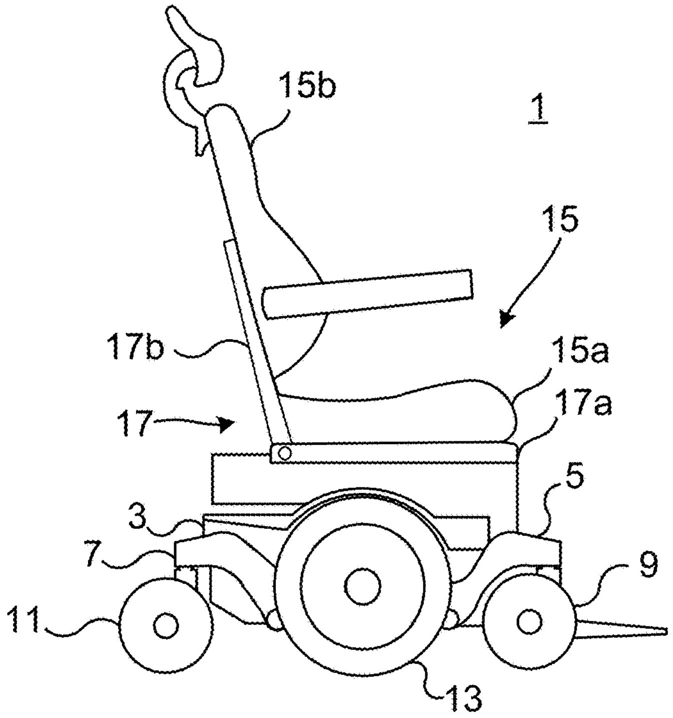
FIG. 1 schematically shows a side view of a general example of an MWD wheelchair.

FIG. 1 schematically shows an example of an MWD wheelchair 1.

The MWD wheelchair 1 comprises a chassis 3. The chassis 3 may be a chassis box that is open or closed.

The MWD wheelchair 1 comprises a pair of front swing arms 5, of which only one is shown in the side view of FIG. 1.

The front swing arms 5 are pivotally connected to the chassis 3.

The MWD wheelchair 1 comprises front support wheels 9. Each front support wheel 9 is connected to a respective front swing arm 5.

The front support wheels 9 may be caster wheels, as shown in FIG. 1. The front support wheels could alternatively be multi-directional wheels or omni-wheels, for example.

The MWD wheelchair 1 comprises a pair of rear swing arms 7, of which only one is shown in the side view of FIG. 1.

The MWD wheelchair 1 comprises rear support wheels 11. Each rear support wheel 11 is connected to a respective rear swing arm 7.

The rear support wheels 11 may be caster wheels, as shown in FIG. 1. The rear support wheels could alternatively be multi-directional wheels or omni-wheels, for example.

The MWD wheelchair 1 comprises a pair of drive wheels 13. The drive wheels 13 are arranged between the front support wheels 9 and the rear support wheels 11.

The drive wheels 13 are pivotally connected to the chassis 3.

The MWD wheelchair 1 comprises a battery (not shown) arranged inside the chassis 3.

The MWD wheelchair 1 comprises drive motors (not shown) configured to drive a respective one of the drive wheels 13.

The drive motors are configured to be powered by the battery.

The MWD wheelchair 1 comprises a seating system 15. The seating system 15 is attached to the chassis 3.

The seating system 15 comprises a seat 15*a* and a backrest 15*b*.

The seating system 15 is configured to be manoeuvred between a seated position, shown in FIG. 1, and a standing position.

The MWD wheelchair 1 may comprise a manoeuvring system configured to lift the seat 15*a* vertically and/or to tilt the seat 15*a* forward. An example of a suitable manoeuvring system is the lift/tilt arrangement disclosed in WO2015/004177, assigned to Permobil AB, the entire contents of which is hereby incorporated by reference in its entirety. Such a system may be operable by means of motor and may, depending on the particular implementation, provide one of anterior tilt, posterior tilt, full standing tilt, and lift, or a combination of anterior/posterior tilt, full standing tilt, and lift.

The manoeuvring system may also be configured to control movement of the backrest 15*b*. By providing tilting and lifting, the manoeuvring system is configured to manoeuvre the seating system 15 between the seated position and the standing position.

The MWD wheelchair 1 comprises a seating system support 17 to which the seating system 15 is mounted. The seating system support 17 comprises a seat support 17*a* and a backrest support 17*b* which is pivotably connected to the seat support 17*a*. The seat support 17*a* may be a seat frame. The backrest support 17*b* may be a backrest frame. The seat 15*a* may be attached to the seat support 17. The backrest 15*b* may be attached to the backrest support 17*b*.

The seat support 17*a* is configured to move together with the seat 15*a* when the seat 15*a* is tilted or lifted.

Figure 3:
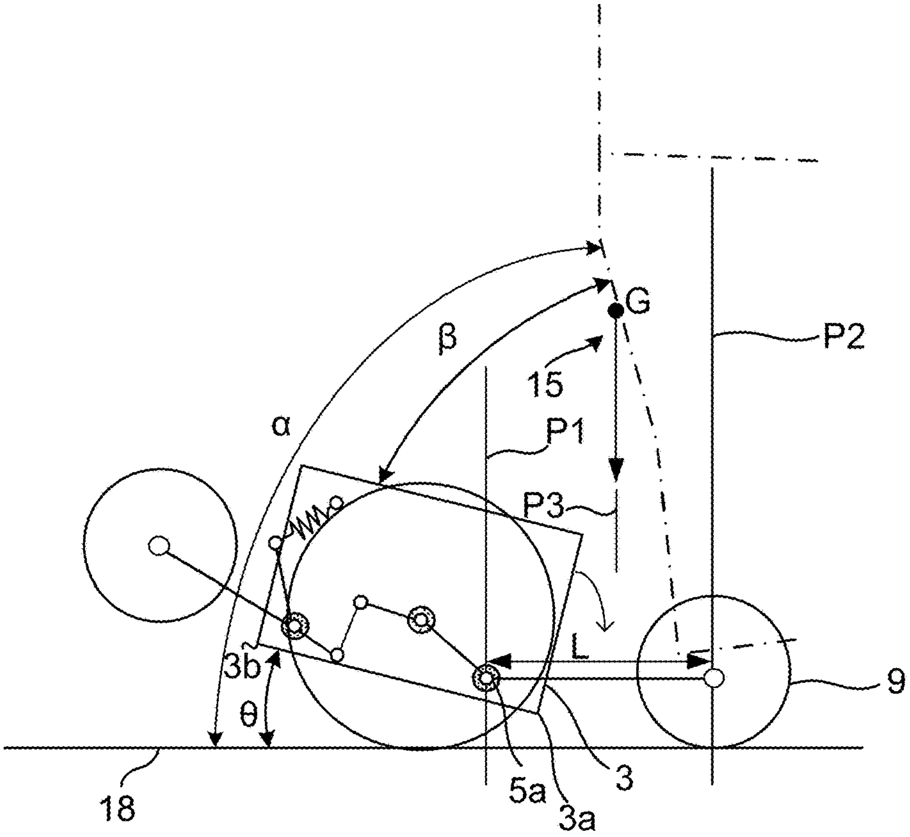
FIG. 3 schematically shows a side view of the MWD wheelchair in FIG. 2 with the seating system in a standing position.

Each front swing arm 5 is configured to pivot relative to the chassis 3, between a first position and a second position. In the first position, the front support wheel 9 is at its uppermost position in relation to the chassis 3. In FIG. 1, this means that the front swing arm 5 is pivoted counterclockwise. The front swing arms 5 are bottomed out in the first position, which is illustrated in FIG. 3. The first position is thus one of two extreme positions (or a first of two maximum pivot positions) that each front swing arm 5 can attain in relation to the chassis 3. Pivoting towards the first position may for example occur when the front support wheel encounters a raised obstacle or when the seating system 15 is set in the standing position, as will be explained in more detail.

In the second position, the front support wheel 9 is at its lowermost position in relation to the chassis 3. In FIG. 1, this means that the front swing arm 5 is pivoted clockwise. The second position is thus the other of two extreme positions (or a second of two maximum pivot positions) that each front swing arm 5 can attain in relation to the chassis 3. Pivoting towards the second position may for example occur when the ground level underneath the front support wheels 9 is lower than underneath the drive wheels 13, such as when traversing a curb or driving over a pothole.

In the remaining figures, the front and rear swing arms are schematically illustrated to show the operative connection between attachment points in the chassis and the front and rear support wheels, respectively. Even though caster wheels are not depicted as such, the illustrated embodiments of FIGS. 2-9 contemplate the use of caster wheels as front and rear support wheels, respectively.

Figure 2:
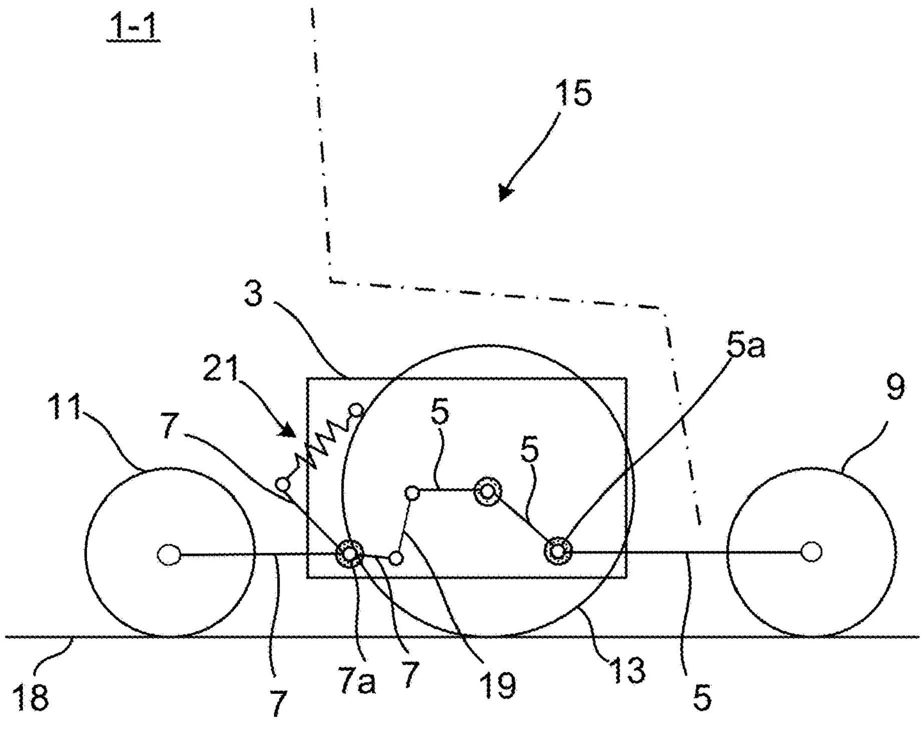
FIG. 2 schematically shows a side view of an example realisation of the MWD wheelchair in FIG. 1 with a seating system in a seated position.

FIG. 2 schematically shows one example realization of the MWD wheelchair 1 in FIG. 1. The exemplified MWD wheelchair 1-1 in FIG. 2 has the seating system 15 in the seated position.

In FIG. 2, the ground or floor surface 18, on which the MWD wheelchair 1-1 rests, is a planar and horizontal surface. All the wheels, i.e., the rear support wheels 11, the drive wheels 13, and the front wheels 9 are in contact with the ground or floor surface 18.

The drive wheels 13 are according to the example mounted to a respective front swing arm 5.

Each front swing arm 5 has its pivot connection 5*a* with the chassis 3 at a respective lateral side of the chassis 3.

Each rear swing arm 7 has its pivot connection 7*a* with the chassis 3 at a respective lateral side of the chassis 3.

The MWD wheelchair 1-1 comprises two linkage members 19. Each linkage member 19 connects one of the front swing arms 5 with the corresponding rear swing arm 7. Each front swing arms 5 is thereby connected to a respective rear swing arm 7 to enable force transfer between the front swing arms 5 and the rear swing arms 7. Pivot movement of a front swing arm 5 may thus cause a pivot movement response of the rear swing arm 7 to which it is connected.

The linkage members 19 are rigid according to the example. Specifically, each linkage member 19 is rigid along its longitudinal axis between the connection points of the linkage member 19 with the front swing arm 5 and the rear swing arm 7.

The MWD wheelchair 1-1 comprises a first resilient member 21 connected to the chassis 3 and to the rear swing arm 7. The first resilient member 21 may form part of a shock absorbing device of the MWD wheelchair 1-1.

FIG. 3 shows the MWD wheelchair 1-1 when the seating system 15 is in the standing position. The drive wheels 13 are in contact with the ground or floor surface 18 when the seating system 15 is in the standing position.

In the standing position of the seating system 15, the seat support 17*a* is at, or brings the seat 15*a* to, an angle $\alpha$ of at least 50°, such as at least 60°, or at least 70°, relative to the horizontal ground or floor surface 18.

In the standing position of the seating system 15, the front swing arms 5 have pivoted to the first position. This results in the chassis 3 being tilted forward. A lower front edge 3*a* of the chassis 3 is thus moved closer to the horizontal ground or floor surface 18 and a lower rear edge 3*b* of the chassis 3 is moved further from the horizontal ground or floor surface 18. It should be appreciated that the pivoting of each front swing arm 5 to the first position (or bottomed out or to the first maximum pivot position) is passive. Similarly, tilting of the chassis 3 forward is passive. This passive movement is in response to movement of the seating system 15 from the seated position (FIG. 2) to the standing position (FIG. 3). Stated another way, the passive pivoting of each swing arm 5 and passive tilting of the chassis 3 is in response to movement of the common centre of gravity G of the MWD wheelchair 1-1 and its occupant from the seated position (FIG. 2) to the standing position (FIG. 3).

Known standing wheelchairs often require a motorized or actuator driven rotation of the front swing arms 5. The MWD wheelchair 1-1 instead advantageously moves the front swing arms 5 relative to the chassis 3 passively, or in response to movement of the seating system 15 and/or the associated centre of gravity G of the wheelchair 1-1 and/or its occupant. Accordingly, the MWD wheelchair 1-1 has a simplified system for supporting the occupant during the transition from the seated position to the standing position, and for supporting the occupant in the standing position. The front swing arms 5 pivot in response to movement of the seating system 15, and do not require additional motors, drives, sensors, actuation devices, warning systems, or other components. Thus, the front swing arms 5 passively pivot (or have an undriven pivot, or a drive-free pivot) relative to the chassis 3. Similarly, tilting of the chassis 3 is in response to movement of the seating system 15, and do not require additional motors, drives, sensors, actuation devices, warning systems, or other components. Thus, the chassis 3 passively tilt (or have an undriven tilt, or a drive-free tilt).

The angle $\alpha=\beta+\theta$, where $\beta$ is the angle between the seat support 17*a* and the top of the chassis 3 and $\theta$ is the tilting angle of the chassis 3 relative to the horizontal ground or floor surface 18. The tilting angle $\theta$ of the chassis 3 is typically at most 6°, such as 2°-4°.

The common centre of gravity G of the MWD wheelchair 1-1 and its occupant is located between a first vertical plane P1 extending through the pivot connections 5*a* of the front swing arms 5 and a wheel axle plane P2 which is a second vertical plane in which wheel axles of the front support wheels 9 are contained when the MWD wheelchair 1-1 rests on the horizontal ground or floor surface 18.

It should be appreciated that known wheelchairs that incorporate both sitting and standing functionality generally include a lock or a locking system to lock a position of each front swing arm when the wheelchair is in the standing position. Locking the front swing arms with such a locking system is intended to provide stability and prevent tipping by restricting movement of the front swing arms. The wheelchair 1-1 advantageously eliminates the need for these known front swing arm locks (or associated locking systems).

The passive pivoting of each front swing arm 5 to the first position (or bottomed out position) is maintained by positioning the common centre of gravity G of the MWD wheelchair 1-1 and its occupant between the first vertical plane P1 and the second vertical plane P2. Stated another way, movement of the seating system 15 to the standing position (shown in FIG. 3) moves the common centre of gravity G between the first and second vertical planes P1, P2. In response to the centre of gravity G being positioned between the first and second vertical planes P1, P2, each front swing arm 5 is directed to maintain its orientation relative to the chassis 3 at the first position (or bottomed out or to the first maximum pivot position). Accordingly, the position of the centre of gravity G in the standing position assists to urge (or direct or apply a force on) each front swing arm 5 to maintain its orientation in the first position (or bottomed out). Thus, a lock (or locking system) is neither necessary nor needed, as the position of the centre of gravity G maintains the first position (or bottomed out) of each front swing arm 5 relative to the chassis 3. Accordingly, the wheelchair 1-1, and/or the front swing arms 5, can be referred to as a lockless or lock-free system that provides stability and prevents tipping in the standing position by utilizing the centre of gravity G to maintain each front swing arm 5 in the first position (or bottomed out position). It should here be noted that when the front support wheels 9 are caster wheels, the wheel axle moves between a forward and a rearward driving direction. Therefore, for caster wheels, the wheel axle plane P2 is defined when the caster wheel is in its most rearward position. This is the position that a caster wheel assumes when the MWD wheelchair 1-1 is driven in a straightforward direction.

For each front swing arm 5 there is a horizontal distance L between the pivot connection 5*a* of the front swing arm with the chassis 3 and the wheel axle plane P2. According to one example, the common centre of gravity G is contained in a third vertical plane P3 located between 20-75%, such as 30-60%, of the horizontal distance L measured from the pivot connection 5*a* when the seating system 15 is in the standing position and the MWD wheelchair 1-1 rests on the horizontal ground or floor surface 18.

Figure 4:
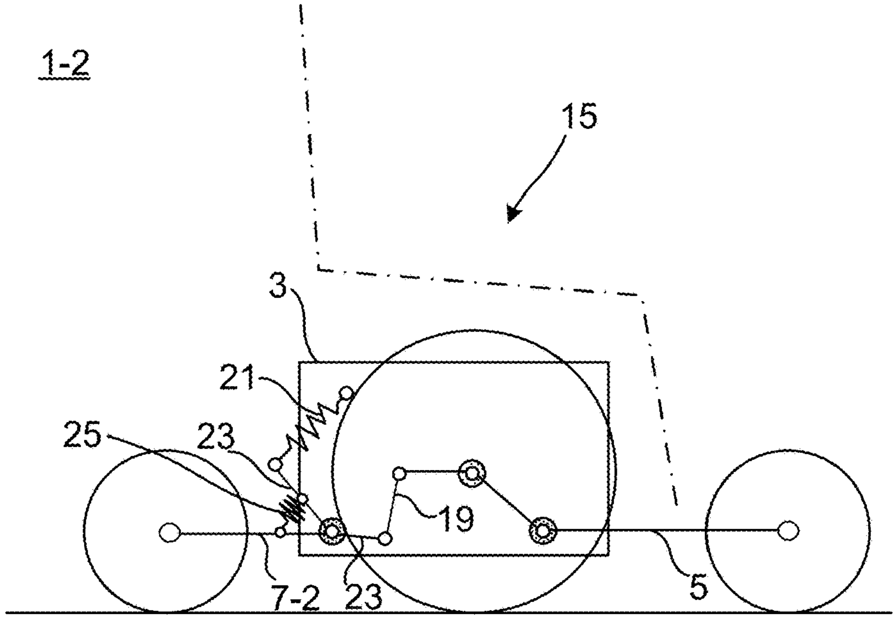
FIG. 4 schematically shows a side view of an example realisation of the MWD wheelchair in FIG. 1 with the seating system in the seated position.

FIG. 4 schematically shows another example realization of the MWD wheelchair 1 in FIG. 1. The exemplified MWD wheelchair 1-2 in FIG. 4 has the seating system 15 in the seated position. The MWD wheelchair 1-2 is in general similar to the MWD wheelchair 1-1. Differences will be explained in the following.

In relation to the MWD wheelchair 1-1, the MWD wheelchair 1-2 further comprises a pair of suspension arms 23.

The suspension arms 23 are pivotally connected to the chassis 3.

Each suspension arm 23 connects a respective front swing arm 5 and rear swing arm 7-2.

Each rear swing arm 7-2 shares the pivot connection to the chassis 3 with a respective suspension arm 23.

According to the example, each linkage member 19 is connected directly between a front swing arm 5 and a suspension arm 23.

Each first resilient member 21 is connected directly to a respective suspension arm 23 and to the chassis 3.

The MWD wheelchair 1-2 comprises second resilient members 25. Each second resilient member 25 is directly connected between a respective pair of rear swing arm 7 and suspension arm 23.

Each second resilient member 25 is configured to force the pair of rear swing arm 7-2 and suspension arm 23, to which it is directly connected, apart. The pair of rear swing arm 7-2 and the suspension arm 23 have the same pivot connection with the chassis 3, which means that the second resilient member 25 tries to turn the rear swing arm 7-2 and the suspension arm 23 apart from each other.

Figure 5:
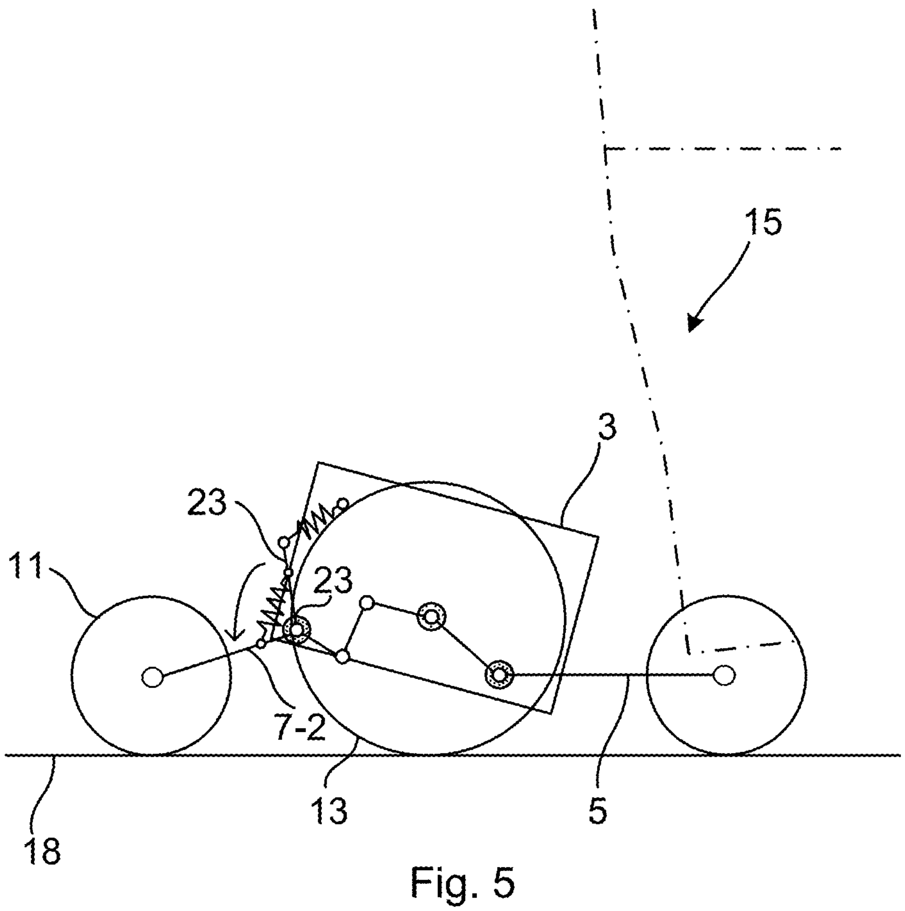
FIG. 5 schematically shows a side view of the MWD wheelchair in FIG. 4 with the seating system in the standing position.

FIG. 5 shows the MWD wheelchair 1-2 when the seating system 15 is in the standing position. The front swing arms 5 have pivoted to the first position. This results in that the chassis 3 is pivoted forward, like for the MWD wheelchair 1-1, as illustrated in FIG. 3.

Due to the second resilient members 25, the rear swing arms 7 are pivoted towards the ground or floor surface 18 such that the rear support wheels 11 contact the ground or floor surface 18. The rear support wheels 11 thus rest on the ground or floor surface 18 when the seating system 15 is in the standing position.

FIGS. 6-9 show various other examples of realisations of the MWD wheelchair 1, all of them showing the chassis and front and rear swing arms when the seating system is in the standing position and the chassis is tilting forward.

Figure 6:
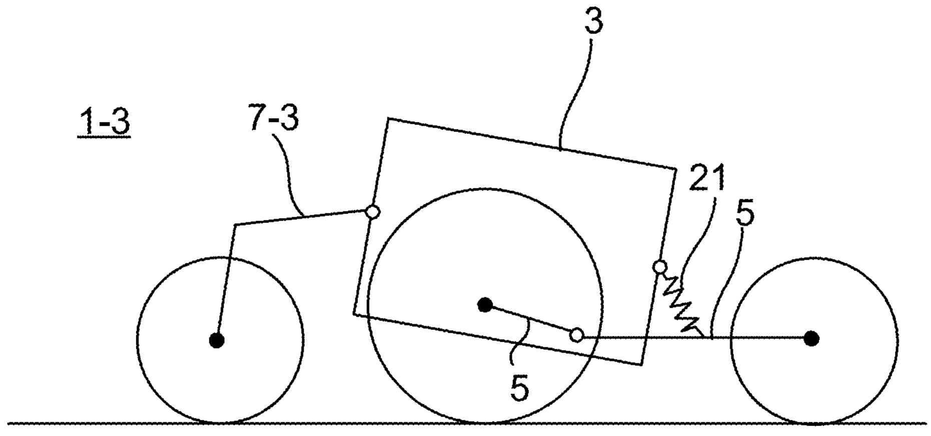
FIGS. 6-9 show various alternative examples of realisations of the MWD wheelchair in FIG. 1.
Figure 7:
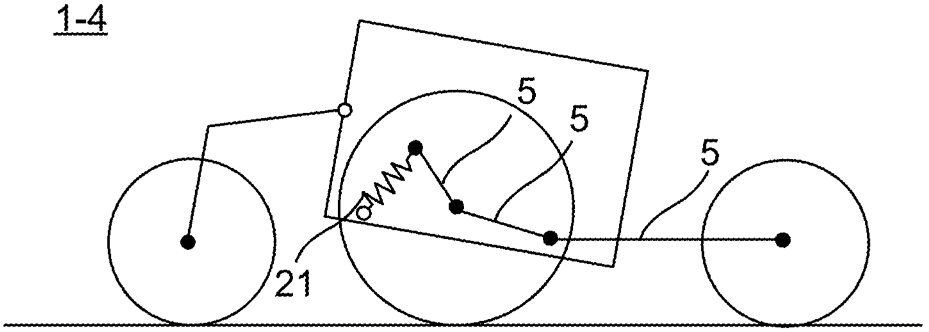

In the example in FIG. 6, the MWD wheelchair 1-3 has rear swing arms 7-3 which are not connected via a linkage member to a respective front swing arm 5. Further, according to the example each first resilient member 21 is connected directly between the chassis 3 and a respective front swing arm 5. This is also the case in for the MWD wheelchair 1-4 in FIG. 7.

Figure 8:
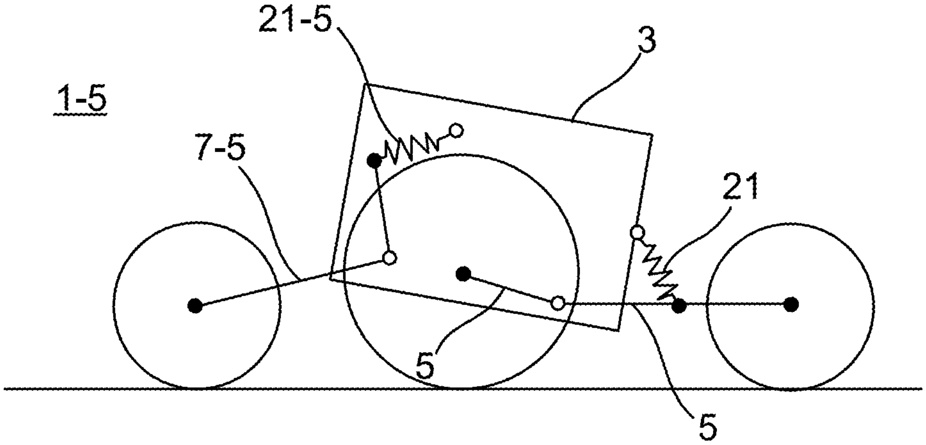

In the example of the MWD wheelchair 1-5 in FIG. 8, the first resilient members 21 are connected directly between the chassis 3 and the front swing arms 5. Moreover, there are additional resilient members 21-5 connected directly to a respective rear swing arm 7-5 and to the chassis 3.

Figure 9:
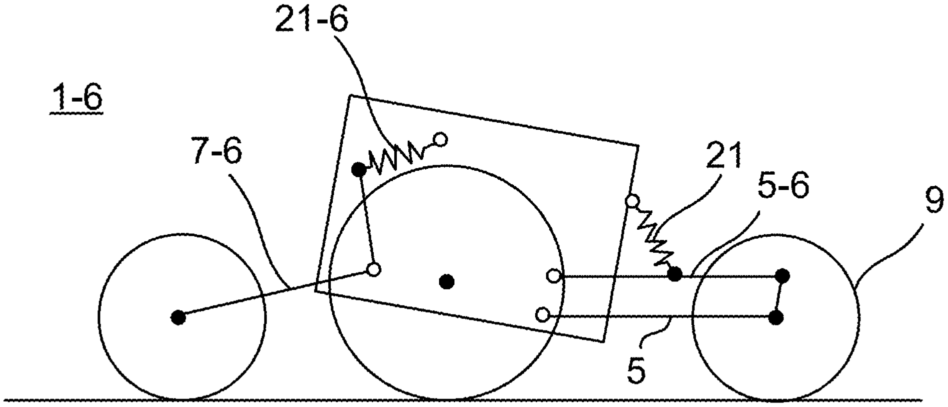

FIG. 9 shows an example of an MWD wheelchair 1-6 in which the front swing arms 5 are connected to the chassis but not to the drive wheels. The MWD wheelchair 1-6 comprises additional front swing arms 5-6 pivotally connected to the chassis 3 at different connection points than the front swing arms 5, and in parallel with a respective front swing arm 5. Each additional front swing arm 5-6 is pivotally connected to a mounting arrangement in a housing to which a front support wheel 9 is connected. Further, additional resilient members 21-6 is connected to a respective rear swing arm 7-6 and to the chassis 3.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A powered midwheel drive, MWD, wheelchair comprising:

a chassis, a seating system attached to the chassis, the seating system being configured to be manoeuvred between a seated position and a standing position, a pair of drive wheels, a pair of front swing arms pivotally connected to the chassis, and front support wheels attached to a respective one of the front swing arms, wherein each front swing arm is configured to pivot in relation to the chassis between a first position, in which the front support wheel is at an uppermost position in relation to the chassis, and a second position, in which the front support wheel is at a lowermost position in relation to the chassis, and wherein the front swing arms are configured to pivot to the first position when the seating system is in the standing position, whereby the chassis is tilted forward in relation to the ground or floor surface.

2. The powered MWD wheelchair as claimed in claim 1, wherein in the standing position of the seating system, a common centre of gravity of the powered MWD wheelchair and an occupant is located between a first vertical plane extending through pivot connections of the front swing arms with the chassis and a wheel axle plane which is a second vertical plane in which wheel axles of the front support wheels are contained when the powered MWD wheelchair rests on a planar horizontal surface.

3. The powered MWD wheelchair as claimed in claim 2, wherein for each front swing arm there is a horizontal distance L between the pivot connection of the front swing arm with the chassis and the wheel axle plane, wherein the common centre of gravity is contained in a third vertical plane located between 20-75%, such as 30-60%, of the horizontal distance L measured from the pivot connection when the seating system is in the standing position.

4. The powered MWD wheelchair as claimed in claim 1, further comprising a pair of rear swing arms pivotally connected to the chassis, wherein each front swing arm is connected to a respective rear swing arm to enable force transfer between the front swing arms and the rear swing arms.

5. The powered MWD wheelchair as claimed in claim 4, further comprising linkage members, wherein each front swing arm and connected rear swing arm is connected via the respective linkage members.

6. The powered MWD wheelchair as claimed in claim 5, wherein each linkage member is rigid.

7. The powered MWD wheelchair of claim 4, further comprising a first resilient members connected to the chassis and to the respective rear swing arm.

8. The powered MWD wheelchair as claimed in claim 7, further comprising a pair of suspension arms, each suspension arm connecting the respective front swing arm and rear swing arm, wherein each first resilient member is connected directly to the respective suspension arm and to the chassis.

9. The powered MWD wheelchair as claimed in claim 8, further comprising second resilient members, each being directly connected between the respective pair of rear swing arm and suspension arm.

10. The powered MWD wheelchair as claimed in claim 9, wherein each second resilient member is configured to force apart the pair of rear swing arm and suspension arm to which each second resilient member is directly connected.

11. The powered MWD wheelchair as claimed in claim 10, wherein each suspension arm and connected rear swing arm share a pivot connection with the chassis.

12. The powered MWD wheelchair of claim 1, further comprising a seat support to which the seating system is mounted, wherein in the standing position the seat support is at an angle $\alpha$ of at least 50°, such as at least 60°, or at least 70° relative to a horizontal plane when the powered MWD wheelchair rests on a horizontal surface, or the seat support brings a seat of the seating system to an angle $\alpha$ of at least 50°, such as at least 60°, or at least 70° relative to the horizontal plane when the powered MWD wheelchair rests on the horizontal surface.

13. The powered MWD wheelchair of claim 1, further comprising a battery, wherein the chassis houses the battery.

14. The powered MWD wheelchair of claim 1, wherein in the first position the front swing arms are bottomed out.

15. The powered MWD wheelchair of claim 1, wherein in the standing position of the seating system, the front swing arms are pivoted to the first position, resulting in the chassis tilting forward.

16. The powered MWD wheelchair of claim 1, wherein the pivoting of the front swing arms to the first position and the forward tilting of the chassis is achieved passively.

17. The powered MWD wheelchair of claim 1, wherein in the standing position of the seating system, a common centre of gravity of the powered MWD wheelchair and an occupant is positioned between a first vertical plane extending through pivot connections of the front swing arms with the chassis and a second vertical plane extending through a wheel axle of the front support wheels of the front swing arms, the common centre of gravity urges each front swing arm to the first position such that each front swing arm is a lock-free front swing arm.

18. The powered MWD wheelchair of claim 1, further comprising a seat support to which the seating system is mounted, wherein in the standing position the seat support is at an angle $\alpha$ of at least 50° relative to a horizontal plane when the powered MWD wheelchair rests on a horizontal surface.

19. The powered MWD wheelchair of claim 1, further comprising a seat support to which the seating system is mounted, wherein in the standing position the seat support is at an angle $\alpha$ of at least 70° relative to a horizontal plane when the powered MWD wheelchair rests on a horizontal surface.

20. The powered MWD wheelchair of claim 1, further comprising a seat support to which the seating system is mounted, wherein the seat support brings a seat of the seating system to an angle α of at least 50° relative to a horizontal plane when the powered MWD wheelchair rests on a horizontal surface.

* * * * *